No. 648,579. Patented May 1, 1900.
J. W. BARTLETT.
PLANTER.
(Application filed Mar. 20, 1899.)
(No Model.) 4 Sheets—Sheet 1.
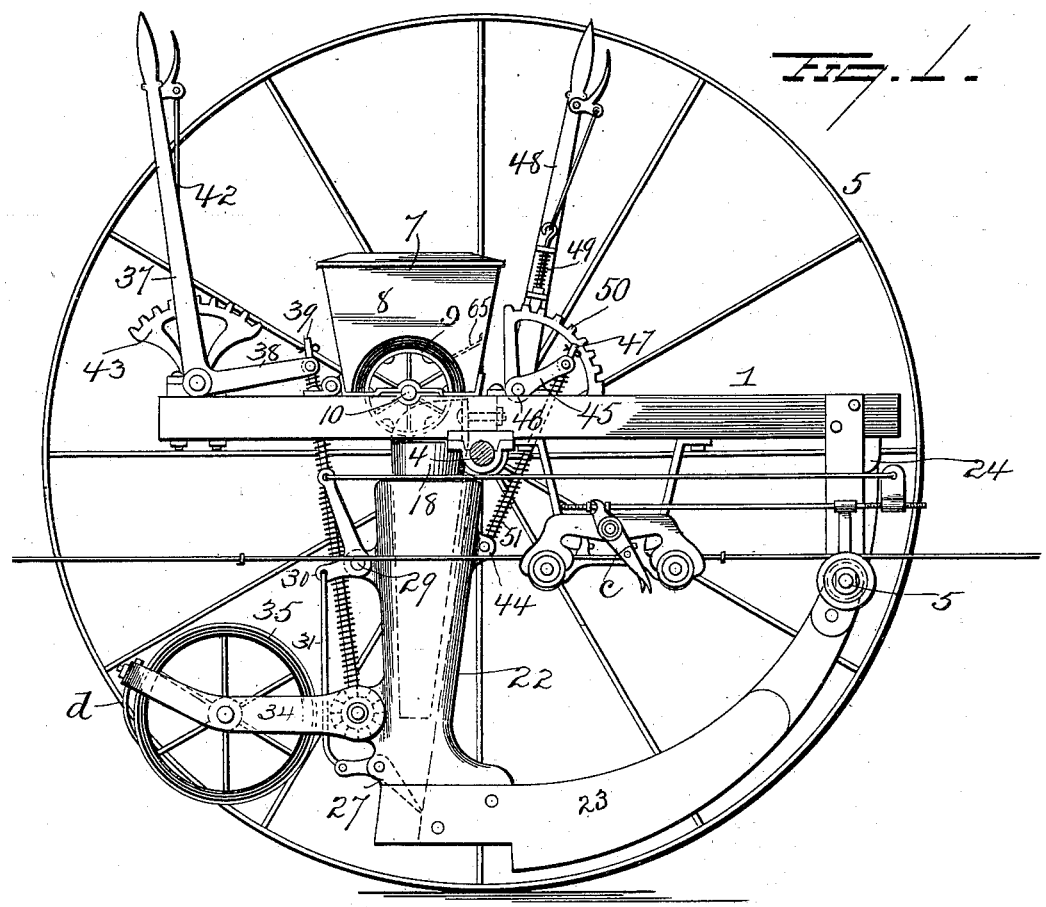
WITNESSES
INVENTOR
J. W. Bartlett
By H. A. Seymour
Attorney No. 648,579. Patented May 1, 1900.
J. W. BARTLETT.
PLANTER.
(Application filed Mar. 20, 1899.)
(No Model.) 4 Sheets—Sheet 2.
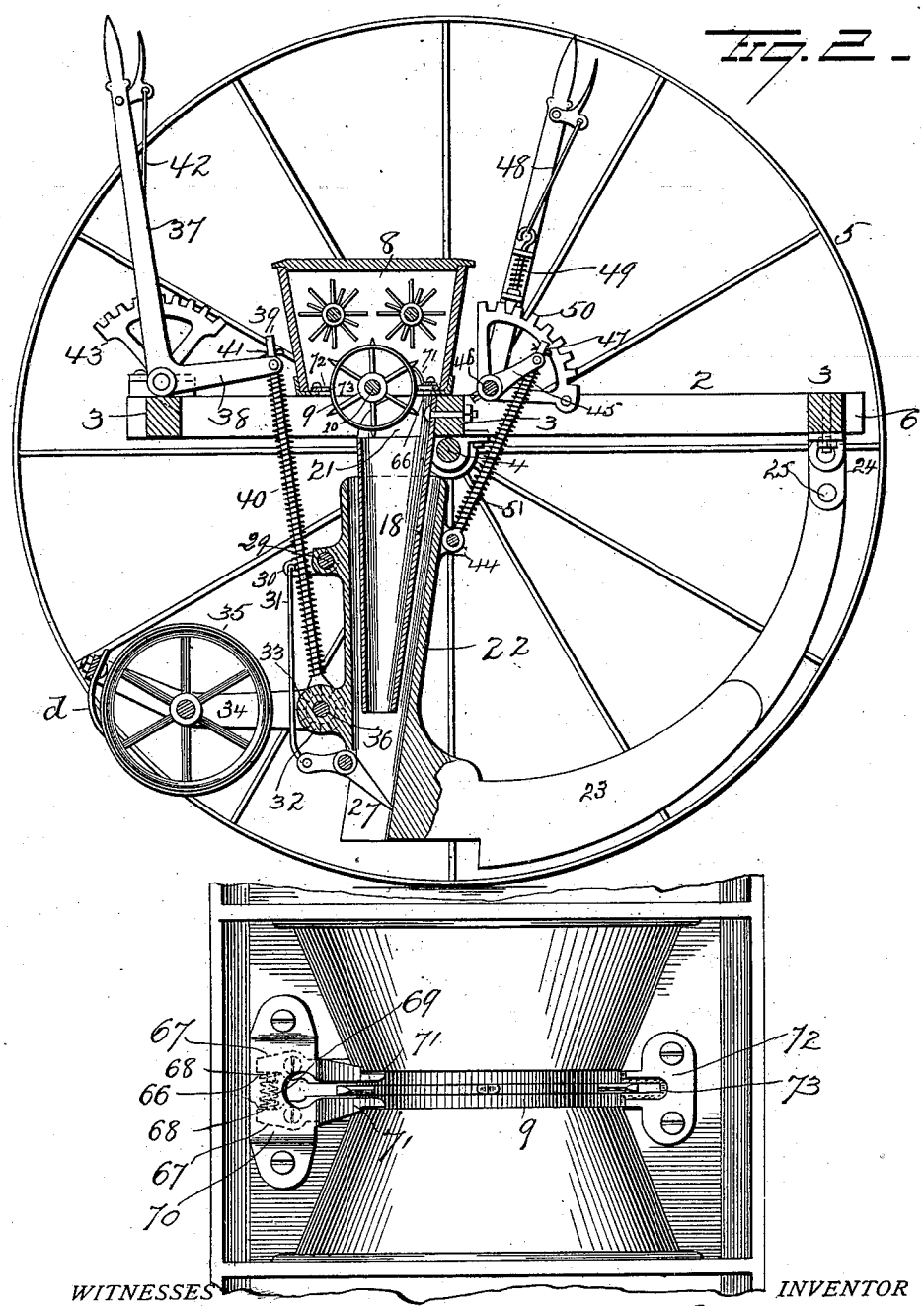
WITNESSES
INVENTOR
J. W. Bartlett

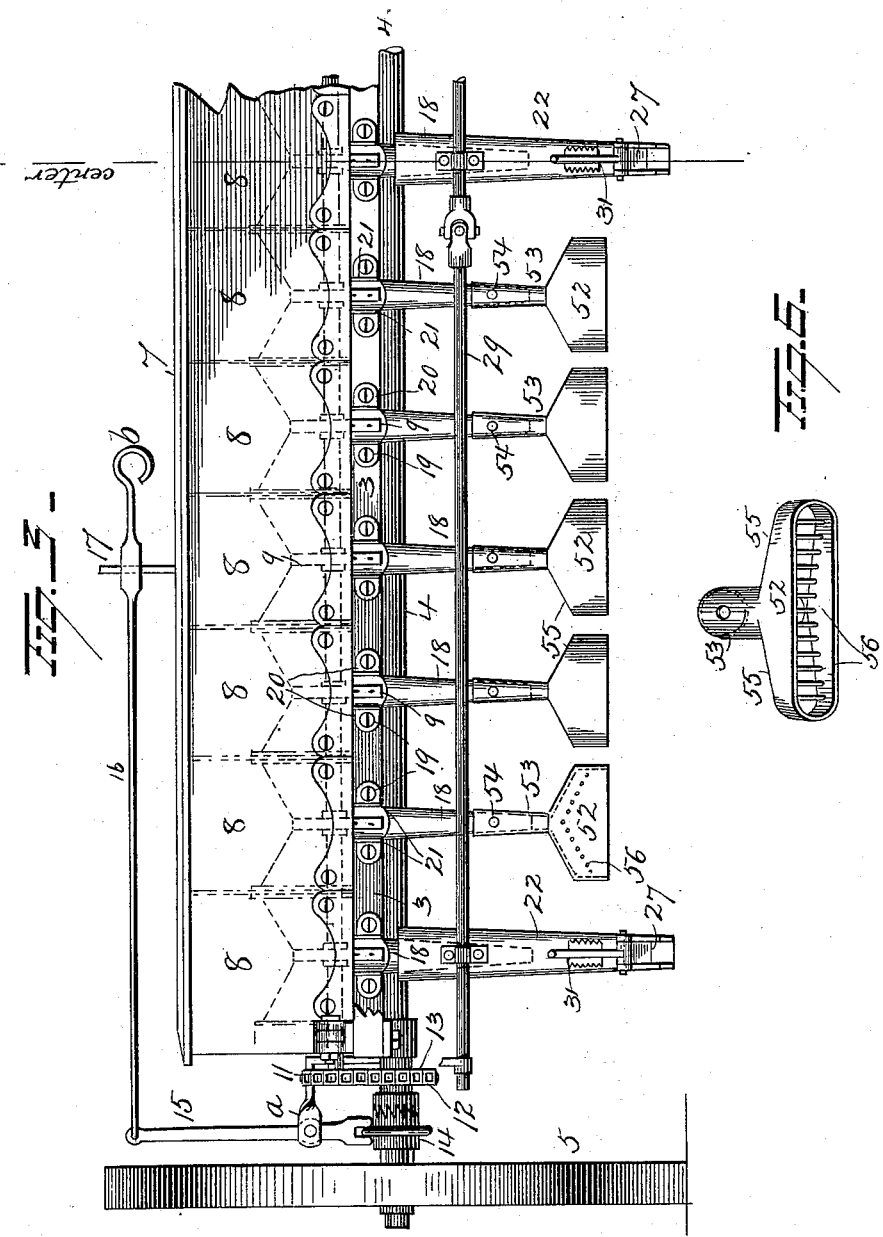

No. 648,579. Patented May 1, 1900.
J. W. BARTLETT.
PLANTER.
(Application filed Mar. 20, 1899.)
(No Model.) 4 Sheets—Sheet 4.
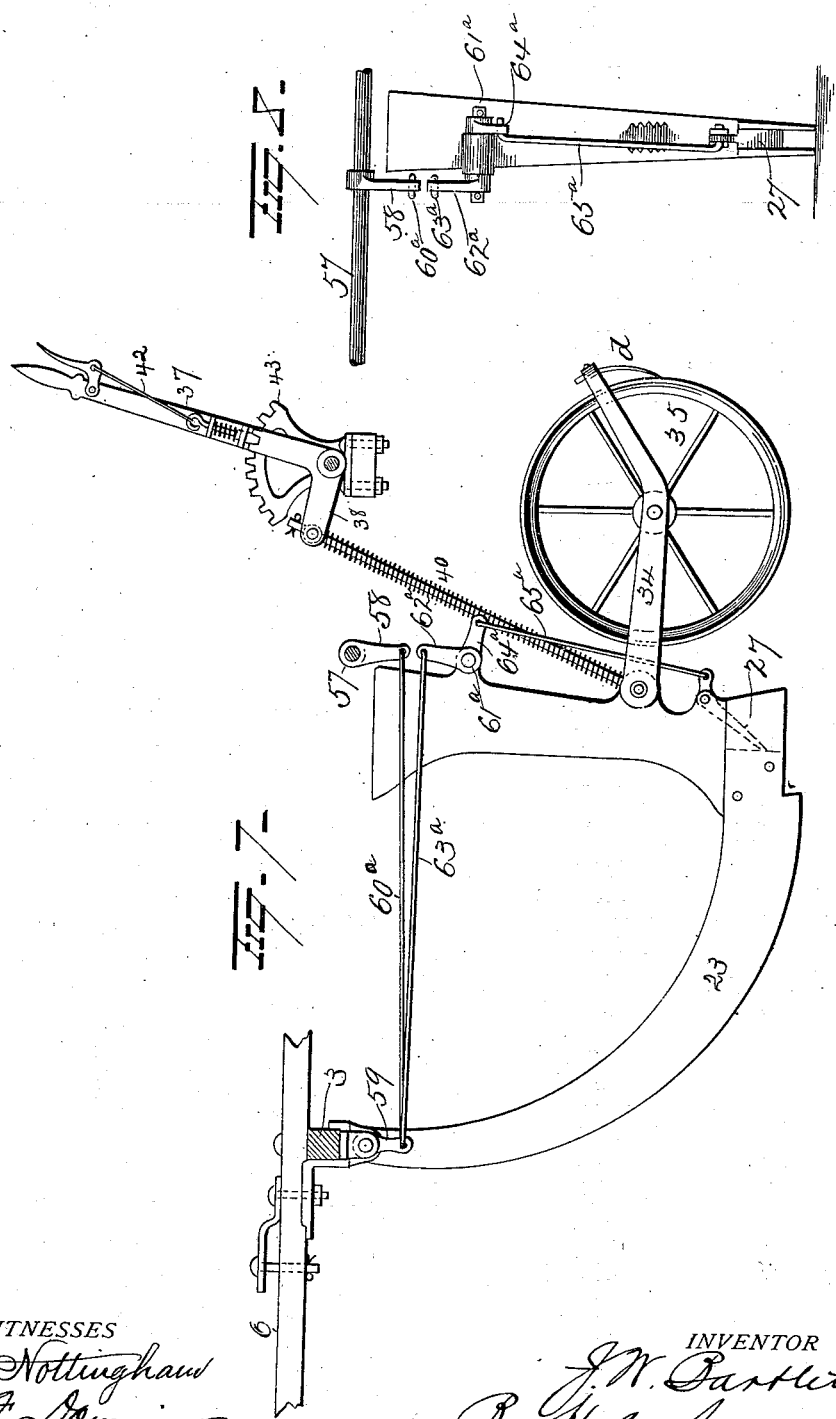
WITNESSES
INVENTOR
J. W. Bartlett
By H. A. Seymour
Attorney

UNITED STATES PATENT OFFICE.

JOHN W. BARTLETT, OF MOLINE, ILLINOIS.

PLANTER.

SPECIFICATION forming part of Letters Patent No. 648,579, dated May 1, 1900.

Application filed March 20, 1899. Serial No. 709,801. (No model.)

*To all whom it may concern:*

Be it known that I, JOHN W. BARTLETT, a resident of Moline, in the county of Rock Island and State of Illinois, have invented certain new and useful Improvements in Planters; and I do hereby declare the following to be a full, clear, and exact description of the invention, such as will enable others skilled in the art to which it appertains to make and use the same.

My invention relates to an improvement in planters, and more particularly to a combined check-row and broadcast planter, one object of the invention being to provide a machine which can be operated to plant corn, cotton-seed, and the like in rows or to plant broadcast, or both, simultaneously.

A further object is to provide a planter with improved devices which will permit one or more boots of the machine to rise and fall without affecting the rest of the boots.

A further object is to so construct a check-row planter that it can be manipulated to plant corn, cotton-seed, vegetables, or other material.

A further object is to provide improved means for adjustably connecting a follower-wheel with a boot of the machine, so that the wheel can be adjusted to accommodate different depths of planting.

A further object is to provide improved means for yieldingly mounting the boots of a planter.

A further object is to construct a check-row and broadcast planter which will permit of a change of speed in dropping the seed and plant either in hills or broadcast.

A further object is to provide a combined check-row and broadcast planter which will be simple in construction, comparatively cheap to manufacture, and most effectual when in operation.

With these objects in view the invention consists in certain novel features of construction and combinations and arrangements of parts, as will be more fully hereinafter described, and pointed out in the claims.

In the accompanying drawings, Figure 1 is an end view of my improved planter with one wheel removed. Fig. 2 is a transverse sectional view. Fig. 3 is a rear view of a portion of the planter. Figs. 4, 5, and 6 are views of details, and Figs. 7 and 8 are views of a modified form of my invention.

1 represents a frame comprising four parallel longitudinal timbers 2, connected at their ends and between their ends by parallel transverse timbers 3. The frame 1 is supported on an axle 4, on which wheels 5 are mounted, and a suitable tongue 6 is secured to the forward timber of the frame.

A trough-shaped box or hopper 7 is secured on the frame 1, and said box contains a series of separate seed-compartments 8, as shown. Each compartment is provided with a concavo-convex hopper-bottom slotted centrally for the reception of a vertical feed-wheel 9, which is mounted on a shaft 10, extending beneath the box 7 and revolubly mounted in suitable bearings on the frame 1. A sprocket-wheel 11 is secured on the shaft 10 near one end thereof and is connected with a sprocket-wheel 12, loosely mounted on the axle 4, by a sprocket-chain 13. A suitable clutch 14 is movably secured on the axle 4 and is provided with an upwardly-extending arm or lever 15, pivotally connected between its ends to a lug $a$ on the frame 1, and is adapted to be moved to operate the clutch to lock the sprocket-wheel 12 in engagement with the axle 4 to transmit motion to the feed-wheels, and hence permit the feeding of the grain. The arm or lever 15 is provided near its upper end with an opening or hole, in which the end of a horizontal rod 16 is secured. The rod 16 projects toward the center of the machine and is mounted in a suitable bracket 17, which is adapted to engage projections (not shown) on the rod 16 to secure the rod in position when the clutch is thrown in or out of engagement with the sprocket-wheel. Any approved handhold $b$ may be provided on the end of the rod 16 for operating same.

A series of conical tubes 18 are secured to the rear face of the central transverse timber 3 by means of fastening devices 19, passing through projections or flanges 20, one on each side of each tube 18, and each tube is provided with parallel ears 21 to more effectually guide the grain. A tube 18 is disposed beneath each feed-wheel and into said tubes the grain is adapted to be fed.

The central tube and each end tube 18 are disposed in boots 22, and the forward end of the runner 23 of each boot 22 is pivotally connected to a downwardly-projecting arm 24 on the front timber 3 by means of a pin or bolt 25, which passes through a hole in said arm 24 and an opening in said runner to permit of a certain longitudinal movement of the runner. Each boot 22 is provided near its lower end with a valve 27, adapted to close said boot and prevent the passage of grain therethrough. The valve 27 is pivotally connected between its ends to the boot 22, having one end projecting outside of said boot. A flexible shaft 29 is disposed in suitable bearings on the boots 22, and said shaft 29 is provided with lugs or arms 30, and said lugs or arms are connected with the outer ends of the valves 27 by means of rods or links 31, so that when said flexible shaft 29 is turned it will operate to deposit the grain from all of the boots simultaneously. The flexible shaft 29 is connected to any approved checking apparatus $c$, whereby to operate same when the machine is being used as a three-row check-row planter. A toothed boss 32 is provided on the rear portion of each boot 22 and is adapted to be locked with a toothed boss 33 on the front end of a rearwardly-projecting bracket 34, carrying any approved follower-wheel 35. The clutch-sections 32 and 33 are held in contact by a screw 36, which will permit of the adjusting of said bracket 34 and wheel 35 relative to the boot 22 to regulate the tension of said boot and wheel on the ground, according to the condition of the ground and the grain being planted. The bracket 34 is provided with a suitable scraper $d$ to scrape the dirt from the wheel 35. An L-shaped lever 37 is pivotally connected between its ends on the rear transverse timber 3, and the short arm 38 of said lever 37 is provided with a hole for the free passage of a rod 39, which is movably connected at its lower end to the heel of the boot 22. A coiled spring 40 is provided on said rod 39, between the lower end thereof and the end of the short arm 38 of the lever 37, whereby to yieldingly hold the boot 22 in contact with the ground. A pin or projection 41 is provided on the upper end of the rod 39 to prevent its escape from the lever 37 and also to permit the raising of said rod and boot when the lever is moved in a rearward direction. A spring-actuated catch 42 is provided on the lever 37, adapted to engage a notched segment 43 on the frame 1, whereby to hold the lever in its desired adjustment. Each end boot 22 is provided on its front face with an eye 44, which is connected with an arm 45 on a rock-shaft 46 by means of a rod or link 47. The rock-shaft 46 is mounted in suitable bearings on the timbers 2 of the frame 1 and is provided with an operating-lever 48. The operating-lever 48 is provided with a spring-actuated catch 49, adapted to engage a notched segment 50, supported on one of the timbers 3, as shown. A coiled spring 51 is provided on each rod or link 47 to normally hold the boots in contact with the ground, and said lever 48 is adapted to operate the rock-shaft 46 to raise and lower the boots and also to regulate the spring tension of same on the ground. The rest of the tubes 18 are provided on their ends with my improved broadcast scatterers 52, which will now be described. Each scatterer is provided with an upwardly-projecting conical tube 53, disposed around each tube 18 (except those which discharge into boots 22) and secured in place by means of a pin 54, passing through openings in said tubes. The lower portions of said scatterers are flattened on their front and rear faces and beveled on their sides, as shown at 55, to form a wide mouth for scattering the grain. A series of horizontal pins or slats 56 are provided in said lower portion of the scatterers and are arranged in general form similar to the beveled side edges thereof to feed uniformly throughout a wide space of ground.

Each feed-box 8 when it is desired to plant corn is provided with a feed-wheel having recesses or pockets in its periphery, and said box is provided at one side with a spring-finger 60, composed of a single piece of metal secured to the bottom of the box, as shown, and projecting upward and then bent downward upon itself and bearing against the periphery of the feed-wheel to hold the grain securely in the pockets of the feed-wheel until ready to drop into the feed-tubes. A spring-pressed cut-off 61 is secured to the bottom of the box above the spring-finger 60 and comprises a base 62, secured to the bottom of the box, and a spring-arm 63, pivoted between its ends on the base 62 and held in contact with the feed-wheel by a coiled spring 64, disposed between one end of the arm 63 and the base 62. A guide-plate 65 is disposed above the cut-off to guide the seed onto the feed-wheel.

When planting cotton-seed, I employ a feed-wheel having fingers thereon, as shown in Figs. 2 and 5. In this form of my invention I provide a cut-off 66. The cut-off 66 comprises two arms or members 67, pivoted between their ends and secured to the bottom of the seedbox, as shown. Each arm 67 is provided at one end with a lug 68, adapted to retain a coiled spring 69 in place to press the inner ends of the arms or members toward each other. A guide-frame 70 is disposed over the cut-off 66 and is provided with upwardly-projecting arms 71 to receive the fingers of the feed-wheel between them, and a suitable slotted plate 72 is disposed at the other end of the slotted bottom of the feed-box to prevent the escape of cotton-seed. A slotted sheet of rubber or other material 73 may be disposed beneath the plate 72 to more effectually close the slotted passage for the fingers of the feed-wheel.

I would have it understood that instead of employing the broadcast scatterers 54, as above described, I might employ boots for each tube similar to the boots 22 and may provide scatterers 54 on all of the tubes 18. However, my improved device will usually be constructed as above described, as the feed-boxes for each tube are separate from each other, and hence certain tubes may be permitted to feed, while the boxes for the others may be kept empty. This is the case when my device is being used as a three-row check-row planter.

The operation of my improved check-row planter is as follows: Motion is transmitted from the axle 4 to the shaft 10 by the sprocket-wheels 11 and 12 and chain 13 to operate the feed-wheels 9 to drop a predetermined number of grains into the tubes 18 and boots 22. The grain will be held in the boots by the valves 27 until the button on the check-line strikes the forked arm of the checking apparatus c, which will operate the flexible shaft 29 and links or rods 31 thereon to open the valves 27 and deposit the grain in the ground, when the valves will be closed to catch the same number of seeds or grains before again being reopened. The number of grains fed can be regulated by the difference in size of the sprocket-wheels 11 and 12, according to the grain being planted.

The broadcast tubes are fed by the feed-wheels 9 and the grain is scattered as heretofore described.

Instead of constructing the seed-dropping mechanism as above described I might construct same as shown in Figs. 7 and 8. In this form of my invention a shaft 57 is revolubly mounted on the frame 1 and is connected with the checking apparatus, as hereinbefore described. The shaft 57 is provided over each boot with a depending arm 58, and said arm 58 is connected with an arm 59, pivoted to the front timber 3 of the frame by a rod 60ª. An L-shaped lever 61ª is pivotally connected to each boot, and the upright arm 62ª of said lever 61ª is connected to the arm 59 by a rod 63ª and the outer arm 64ª of the lever 61ª is connected to the valve in the boot by a rod 65ª, as shown. It will be seen from the above description that the boots can be moved up and down without affecting the valve-operating mechanism in the slightest.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a planter, the combination with a frame, of a seed or grain receptacle on said frame, boots below said seed or grain receptacle, means for dropping seed or grain into said boots, valves in the boots for detaining the seed or grain therein, a flexible shaft mounted directly on the boots, means for operating said shaft and connecting devices between said valves in the boots and the flexible shaft to operate said valves to deposit the seed or grain.

2. In a planter, the combination with a frame, of a seed or grain box mounted on said frame, a shaft below the bottom of said seed or grain box, feed-wheels on said shaft, tubes below said feed-wheels and adapted to receive grain therefrom, and scatterers on the ends of said tubes having a flattened enlarged portion at its end and pins or slats in said flattened portion for scattering the seed or grain over the ground.

3. In a planter, the combination with a frame, of a seed or grain box disposed on said frame and partitioned off into several independent compartments, each compartment provided with a concavo-convex bottom slotted centrally, a feed-wheel for each compartment disposed under the slot in said bottom, a tube for each feed-wheel, each tube adapted to receive grain independently from a single compartment and means in said tubes for regulating the feed of the seed or grain.

4. In a planter, the combination with a frame, of a seed or grain box disposed on said frame, a series of partitions in said box forming several compartments or receptacles, a concavo-convex slotted bottom for each receptacle, a feed-wheel for each receptacle coincident with the slot in the bottom, separate tubes for each feed-wheel, a boot for each tube, and a spring-actuated rod for each boot adapted to yieldingly hold said boots in contact with the ground.

5. In a planter, the combination with a frame, of a seed or grain box on said frame, partitions in said box forming several receptacles, a concavo-convex bottom in each receptacle, a separate feed-wheel for each receptacle, a boot into which each feed-wheel empties, a clutch-section on each boot, a bracket, a clutch-section on said bracket to engage said first-mentioned clutch-section, a follower-wheel mounted in said bracket, and a scraper on said bracket for the wheel.

6. In a planter, the combination with a seed or grain box, of a series of feed-tubes communicating with said seed or grain box, boots disposed around the lower end of said tubes, valves in said boots, a flexible shaft mounted in bearings on said boots, and means connecting the shaft and each valve to operate all of said valves simultaneously to drop the seed or grain.

7. In a planter, the combination with three feeding-tubes spaced apart and a boot inclosing each of said tubes and adapted to receive grain therefrom, of a valve in each boot, a flexible shaft mounted in bearings on said boots, arms on said shaft, links or rods connecting said arms and valves, and means connected with said flexible shaft for operating it.

8. In a planter, the combination with a frame, a seedbox and a feed-wheel therefor, of a tube into which the feed-wheel discharges, flanges or lugs on said tube to secure same to the frame, and approximately-parallel outwardly-projecting ears on said tube to guide the seed or grain discharged from the feed-wheel.

9. In a planter, the combination with a frame and a seedbox having a series of receptacles, of feed devices for each receptacle, a series of vertically-movable boots communicating with said feed devices, an operating-lever, connections between said operating-lever and the end boots of the series, locking means for said lever and another operating-lever independently connected with the intermediate boot of the series, locking means for said last-mentioned lever, and yielding devices for said boots.

10. In a planter, the combination of a seedbox having a concavo-convex slotted bottom, a feed-wheel coincident with the slot in said bottom, and a seed-guide secured in said bottom and consisting of spring metal bent upon itself and forming a spring-finger substantially concentric with the feed-wheel.

11. In a planter, the combination of a feed-box having a concavo-convex slotted bottom, a vertical feed-wheel coincident with the slot in the bottom, a spring-finger secured in the seedbox and disposed substantially concentric with the feed-wheel and a guide-plate constructed and arranged to direct grain into the feed-wheel above the free end of said spring-finger.

12. The combination of a seedbox having a concavo-convex slotted bottom, a feed-wheel mounted under and concentric to the slotted bottom, a spring-pressed cut-off device adapted to engage said feed-wheel, a spring guide-finger below the cut-off and concentric with the feed-wheel and a guide-plate adapted to direct the grain to the feed-wheel in advance of the cut-off.

13. The combination of a seed-hopper having a slotted bottom, a feed-wheel under said bottom and having fingers projecting through the slot therein and a cut-off consisting of two jaws pivoted independently to the bottom of the seedbox at respective sides of the slot therein, lugs projecting rearwardly from said pivotal connections and a spring disposed between the lugs of the respective jaws.

In testimony whereof I have signed this specification in the presence of two subscribing witnesses.

JOHN W. BARTLETT.

Witnesses:
GUY R. FRAZELLE,
E. H. HEIGHT.